United States Patent
Niino

(10) Patent No.: US 8,635,370 B2
(45) Date of Patent: Jan. 21, 2014

(54) BLADE SERVER AND SWITCH BLADE

(75) Inventor: Ryuta Niino, Tokyo (JP)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 12/389,640

(22) Filed: Feb. 20, 2009

(65) Prior Publication Data

US 2009/0207563 A1    Aug. 20, 2009

(30) Foreign Application Priority Data

Feb. 20, 2008    (JP) ................................. 2008-039398

(51) Int. Cl.
*G06F 15/16*    (2006.01)

(52) U.S. Cl.
USPC ............. 709/248; 709/201; 709/213; 714/10; 714/11; 714/12; 714/6.2

(58) Field of Classification Search
None
See application file for complete search history.

(56) References Cited

U.S. PATENT DOCUMENTS

| | | | |
|---|---|---|---|
| 5,226,152 A | | 7/1993 | Klug et al. |
| 6,654,370 B1 * | | 11/2003 | Quirke et al. ................. 370/389 |
| 2005/0039074 A1 * | | 2/2005 | Tremblay et al. ............... 714/11 |
| 2005/0195928 A1 * | | 9/2005 | Yamazaki ..................... 375/354 |

FOREIGN PATENT DOCUMENTS

| | | |
|---|---|---|
| JP | 6-149605 A | 5/1994 |
| JP | 8-185329 A | 7/1996 |
| JP | 8-297588 A | 11/1996 |
| JP | 9-16535 A | 1/1997 |
| JP | 2004-318702 A | 11/2004 |
| JP | 2005-244479 A | 9/2005 |
| JP | 2005-527006 A | 9/2005 |
| JP | 2005302020 A | 10/2005 |
| JP | 2007122698 A | 5/2007 |

OTHER PUBLICATIONS

Japanese Office Action for JP2008-039398 mailed on Jan. 29, 2013 with English Translation.

* cited by examiner

*Primary Examiner* — Thomas Dailey
*Assistant Examiner* — Nam Tran

(57) ABSTRACT

A blade server is capable of being mounted with a plurality of operation blades, a plurality of switch blades, and I/O blades. The operation blades have CPUs that emit packets for the I/O blades. The switch blades include a crossbar that selects two or more of the plurality of operation blades, comparators that compare two or more packets emitted by CPUs that the two or more operation blades selected by the crossbar are provided with, and a further crossbar that transfers the compared packets to the I/O blades based on comparison results of the comparators.

8 Claims, 9 Drawing Sheets (EACH MANAGEMENT BLADE 40)  (EACH SWITCH BLADE 20)

BLADE SERVER AND SWITCH BLADE

BACKGROUND OF THE INVENTION

This application is based on Japanese Patent Application No. 2008-039398 filed on Feb. 20, 2008 and including specification, claims, drawings and summary. The disclosure of the above Japanese Patent Application is incorporated herein by reference in its entirety.

FIELD OF THE INVENTION

The present invention relates to a blade server and a switch blade for implementing a fault-tolerant function.

DESCRIPTION OF THE RELATED ART

Currently, blade servers are being produced that carry out arbitrary processing at a plurality of mounted blades (for example, refer to Unexamined Japanese Patent Application KOKAI Publication No. 2007-122698).

Fault-tolerant computers are also being produced that are able to continue operating by building in redundancy even if a part of the computer fails (for example, refer to Unexamined Japanese Patent Application KOKAI Publication No. 2005-302020).

If a certain blade in the above blade server then fails, it is possible for the blade to be separated and for other blades to be made to operate. This does, however, mean that packets are lost during processing at the damaged blade.

Fault-tolerant computers have therefore been applied as blades. However, in this case, it is possible to carry out lock-stepping within this blade but it is not possible to carry out lock-stepping across a plurality of blades.

SUMMARY OF THE INVENTION

It is therefore an object of the present invention to provide a blade server and a switch blade that implement a fault-tolerant function between blades.

In order to achieve the above object, a blade server of a first aspect of the present invention comprises:

a blade server mounted with a plurality of blades and performing arbitrary processing at the plurality of blades, comprising:

a plurality of operation blades, one or more input/output blades that input and output data from and to outside, and one or more switch blades intermediating between the operation blades and the input/output blades, constituting the plurality of blades.

The operation blades have operation units that issue packets for the input/output blades.

The switch blades comprise:

a selection unit that selects two or more operation blades that carry out the same operations and issue the same packets from the plurality of operation blades;

a comparison unit that compares the two or more packets issued by the operation units that the two or more operation blades selected by the selection unit are provided with; and a transfer unit that transfers the compared packets to the input/output blades based on results of comparison by the comparison unit.

For example, it is also possible to further provide one or more management blades having:

a monitoring unit that monitors states of the plurality of blades including the plurality of operation blades, the plurality of input/output blades, and the plurality of switch blades; and a connecting unit for connecting and disconnecting the plurality of blades according to the states monitored by the monitoring unit.

For example, the monitoring unit of the management blades monitor delays of clocks between each blade.

The switch blades can further comprise an adjusting unit that adjusts delays of the two or more packets based on clock delays for the two or more operation blades and the switch blades monitored by the monitoring unit. The comparison unit of the switch blades can compare the two or more packets subjected to delay adjustment by the adjusting unit.

For example, the adjusting unit can perform adjustment so that the packets arrive at the two or more operation blades at the same time based on the clock delays between the two or more operation blades and the switch blades monitored by the monitoring unit when the switch blades receive packets sent from the input/output blades to the operation blades.

For example, the plurality of management blades can also perform connection in such a manner that it is possible to carry out the same processing using a plurality of paths by combining the plurality of operation blades, the plurality of switch blades, and the plurality of input/output blades.

Further, a switch blade of a second aspect of the present invention is capable of being mounted in a blade server equipped with a plurality of operation blades having operation units that issues packets, and one or plurality of input/output blades that input and output data from and to outside, comprising:

a selection unit that selects two or more operation blades from the plurality of operation blades;

a comparison unit that compares the two or more packets issued by the operation units that the two or more operation blades selected by the selection unit are provided with; and a transfer unit that transfers the compared packets to the input/output blades based on comparison results of the comparison unit.

For example, it is also possible to further provide an adjusting unit that adjusts delays of the two or more packets based on clock delays for the two or more operation blades and the switch blades monitored by the monitoring unit.

The comparison unit then compares the two or more packets whose delay is adjusted for by the adjusting unit.

For example, the adjusting unit can perform adjustment so that the packets arrive at the two or more operation blades at the same time based on the clock delays between the two or more operation blades and the switch blades when the switch blades receive packets sent from the input/output blades to the operation blades.

The blade server of the present invention is capable of implementing a fault-tolerant function between blades.

DETAILED DESCRIPTION OF THE PREFERRED EMBODIMENTS

First Embodiment

Figure 1:
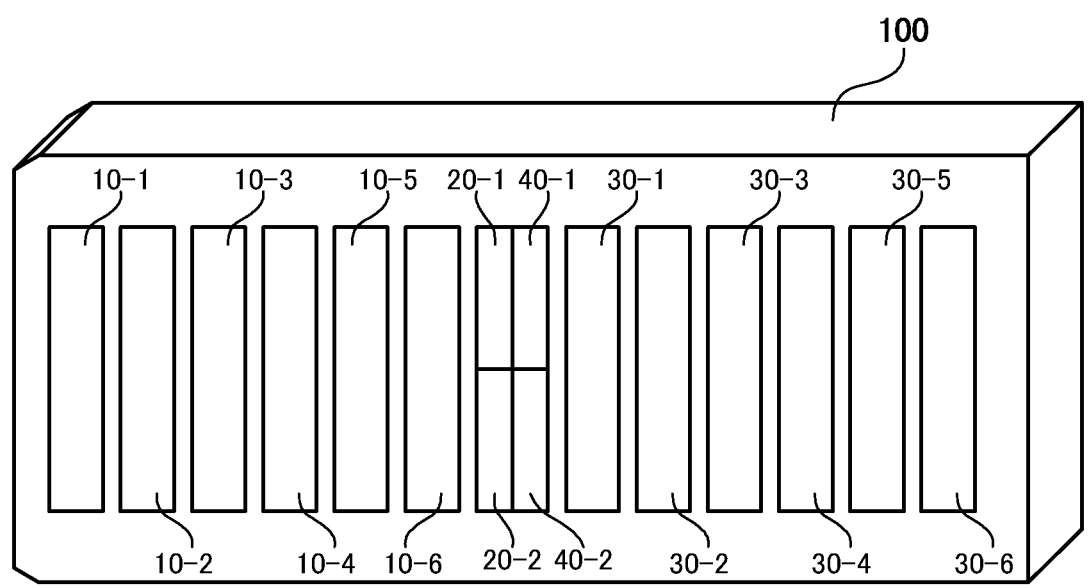
FIG. 1 is a perspective view of a blade server of first and second embodiments of the present invention.

An explanation is given in the following of a blade server 100 of a first embodiment of the present invention. As shown in FIG. 1, the blade server 100 is detachably mounted with a plurality of operation blades 10, a plurality of switch blades 20, a plurality of I/O blades 30, and a plurality of management blades 40. Hereafter, respective operation blades 10-1, 10-2, . . . in the drawing are referred to as operation blades 10, respective switch blades 20-1, 20-2, . . . are referred to as switch blades 20, respective I/O blades 30-1, 30-2, . . . referred to as I/O blades 30, and respective management blades 40-1, 40-2, . . . are referred to as management blades 40. Each of the blades are connected by wiring from the backplane.

Figure 2:
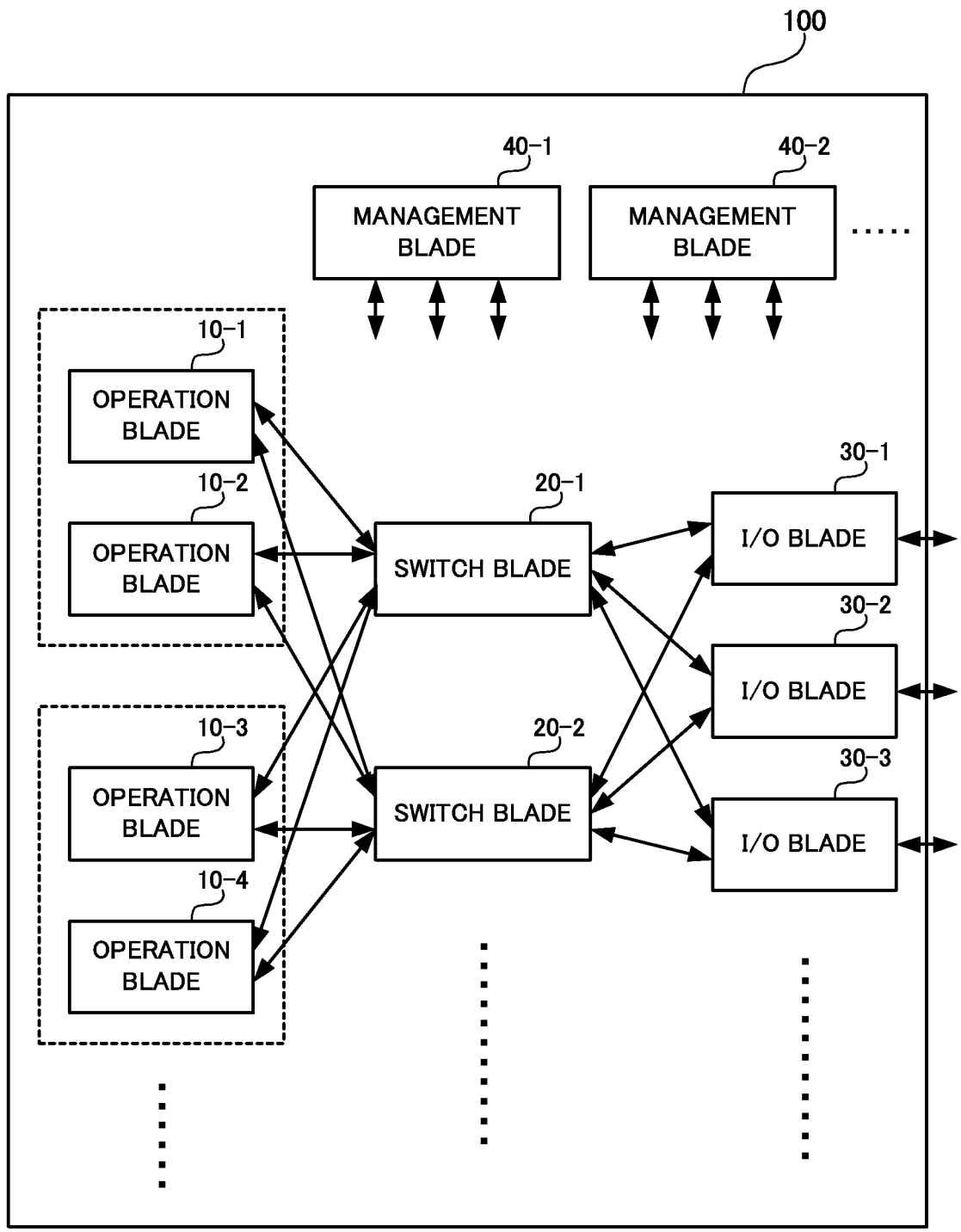
FIG. 2 is a structural view of the blade server of the first and second embodiments of the present invention.

As shown in FIG. 2, each operation blade 10 is connected to all of the switch blades 20, and each switch blade 20 is connected to all of the I/O blades 30. Each management blade 40 is then connected to all of the operation blades 10, switch blades 20, and I/O blades 30.

Delays in the clocks occurring between each operation blade 10 and each switch blade 20 then differ depending on the difference in length of wires on the backplane. For example, in the example shown in FIG. 3, clock delays occurring between the operation blade 10-1 and the switch blades 20 are the largest delays, and clock delays occurring between the operation blade 10-6 and the switch blades 20 are the smallest delays. Delays in the clocks occurring between each I/O blade 30 and each switch blade 20 are also the same as for the above example.

The operation blades 10 carry out processing based on requests from external devices or the management blades 40 and send back processing results. Each operation blade 10 carries out lock-stepping at the blade server 100. Each operation blade 10 carrying out the lock-stepping therefore carries out the same processing and issues the same packets.

Figure 4:
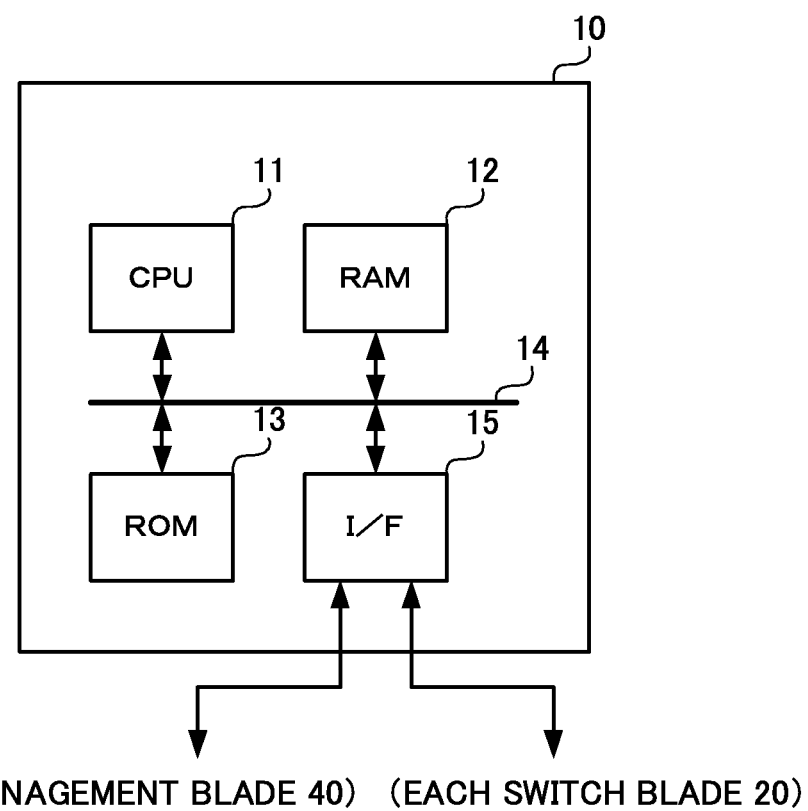
FIG. 4 is a structural view of an operation blade of FIG. 2.

As shown in FIG. 4, the operation blades 10 include a CPU (Central Processing Unit) 11, a RAM (Random Access Memory) 12, a ROM (Read-Only Memory) 13, a bus 14, and an interface 15.

The interface 15 is connected to each of the switch blades 20 and each of the management blades 40.

The switch blades 20 are crossbar switches. Packets sent between the blades all pass via the switch blades 20. The switch blades 20 have a fault-tolerant function for selecting two operation blades 10 and comparing packets from the two selected operation blades 10, and a queuing mechanism for implementing this function. In the following, a switch blade 20 selecting two operation blades 10 and comparing these packets is referred to as "redundancy".

Figure 5:
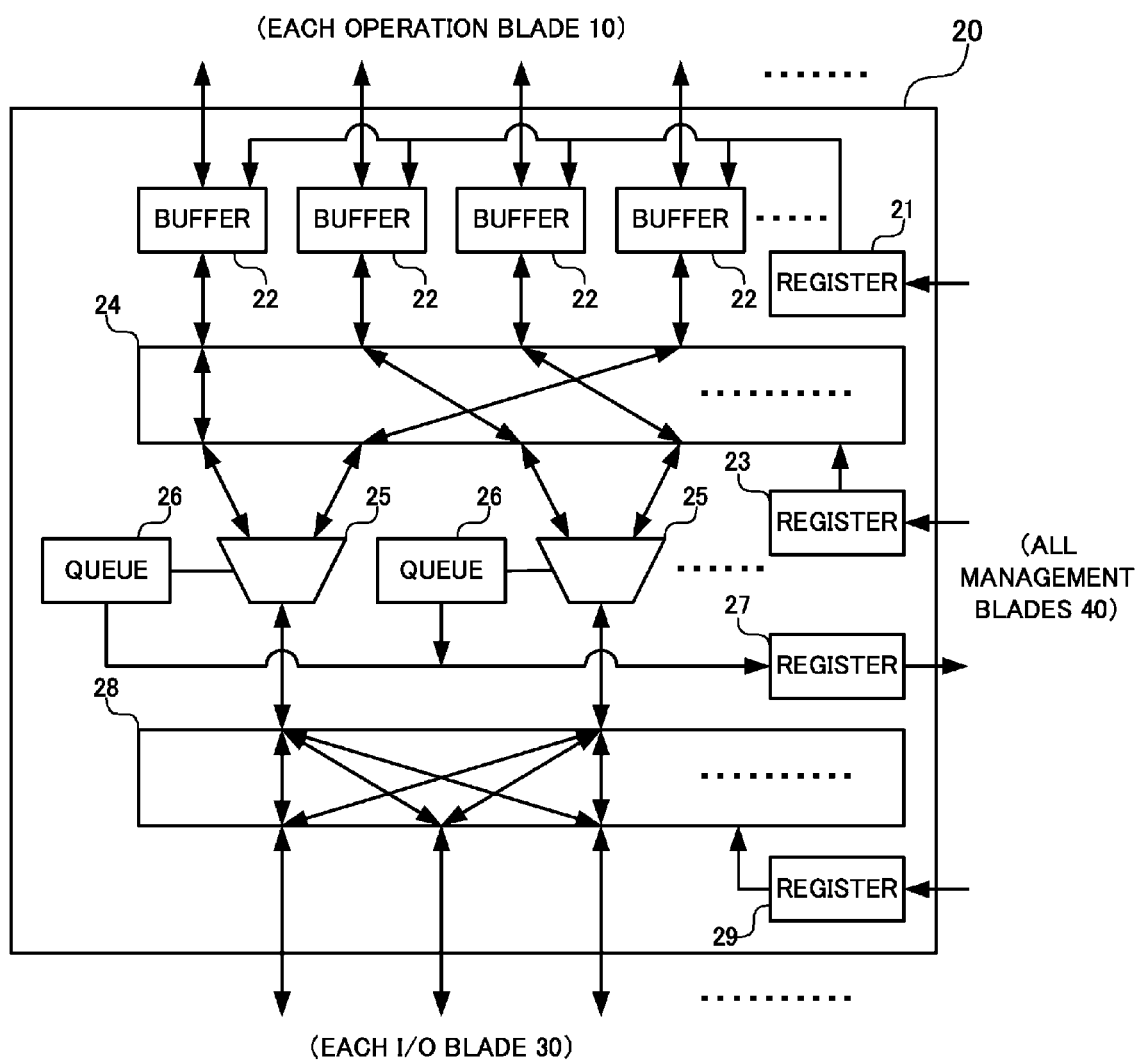
FIG. 5 is a structural view of switch blade routing of the first embodiment.

As shown in FIG. 5, the switch blades 20 include registers 21, 23, 27, 29, a plurality of buffers 22, crossbars 24 and 28, a plurality of comparators 25, and a plurality of queues 26.

Figure 3:
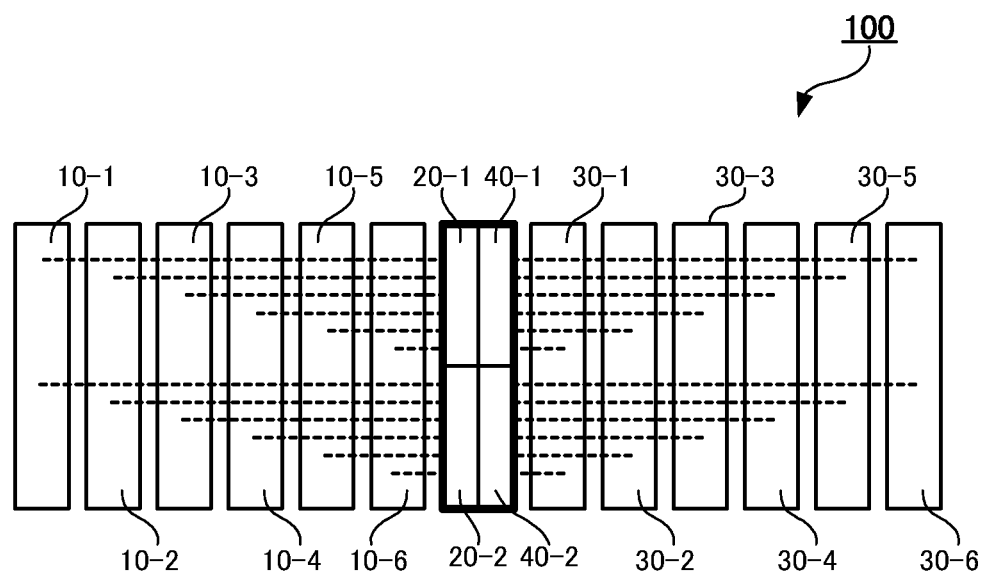
FIG. 3 is a view explaining differences in lengths of wires on a backplane that cause differences in delays of clocks between blades mounted on the blade server of the first and second embodiments of the present invention.

The register 21 stores packet delay information between the switch blades 20 and the operation blades 10 supplied by the management blade 40. As shown in FIG. 3, the distances between the operation blades 10 and the switch blades 20 on the backplane vary depending on the mounted location. This means that differences between delays occurring for each operation blade 10 occur for a high-speed clock. The register 21 stores delay difference information (packet delay information) for the two redundant operation blades 10 and then inserts delays at each buffer 22 by referring to these values.

Each of the buffers 22 are connected to each of the operation blades 10. Each buffer 22 is then adjusted based on the packet delay information stored in the register 21 so that packets supplied by each operation blade 10 arrive at each comparator 25 at the same time.

Describing in further detail, when there is a clock delay difference between blades, packets are sent so as to match with the clock of the slower blade. The buffer 22 that the faster operation blade 10 is connected to then cancels out differences in delays by storing the packets. When data is supplied by the operation blades 10, each buffer 22 is adjusted so that the packets arrive at each of the I/O blades 30 at the same time. When packets are supplied by the I/O blades 30, each buffer 22 is adjusted so that the data arrives at each of the operation blades 10 at the same time.

The register 23 stores information for the operation blades 10 carrying out lock-stepping ("first routine information" in the following). The register 23 is supplied with and stores the first routing information from the management blades 40.

The crossbar 24 refers to the first routing information stored in the register 23 and switches wiring connecting between each of the operation blades 10 and each of the comparators 25. The crossbar 24 can then select an arbitrary operation blade 10 as the target of lock-stepping by changing the first routine information stored by the register 23. As shown in FIG. 5, the crossbar 24 connects the respective two operation blades 10 and the respective comparators 25.

The comparators 25 then compare outbound packets and issue branches for inbound packets.

Each of the queues 26 assigned to each of the comparators 25 then temporarily stores packets that arrive first at the comparator 25 in order to perform comparisons with packets issued by the operation blades 10. When another packets then arrive at the comparators 25 thereafter, the queues 26 then supply the temporarily-stored packets to the comparators 25 and then erases the temporarily-stored packets. The comparator 25 then compares the two packets. When the two packets match, the packets are supplied to the crossbar 28 via the queues 26.

Timeout values are set at the queues 26. The queues 26 issue a comparison error when a packet that is the target of comparison does not arrive before a timeout value is exceeded from the first packet arriving at the comparators 25.

The queues 26 also issue a comparison error when the comparators 25 determine that the packets arriving from the two operation blades 10 are different.

The queues 26 then store the comparison errors issued by the queues 26 in the register 27 and then send the comparison errors to the management blades 40. The management blades 40 then determine which blades to be separated within the blade server 100 based on the comparison errors.

For example, it is appropriate to separate a portion including an operation blade 10 where a packet that has not arrived originates when a packet does not arrive. For example, it is appropriate to separate a portion including the two operation blades 10 that the packet that has not arrived originates from when packets are different.

The switch blades 20 include a plurality of combinations of the comparators 25 and the queues 26. Namely, the switch blades 20 include a plurality of fault tolerant systems.

The comparators 25 transfer the same packets to the two terminals of the operation blades 10 when packets are received from the I/O blades 30. This is to say that the comparators 25 send packets to the two operation blades 10 provided redundantly.

The crossbar 28 is connected to each of the I/O blades 30 at the backplane. The crossbar 28 then refers to a second routing information stored in the register 29 and manages the connections for each of the comparators 25 and each of the I/O blades 30.

The register 29 stores information for the connected comparators 25 and the I/O blades 30 (second routing information). The register 29 is supplied with and stores the second routing information from the management blades 40.

The I/O blades 30 are blades mounted with I/O functions such as LAN (Local Area Network) and storage etc.

Figure 6:
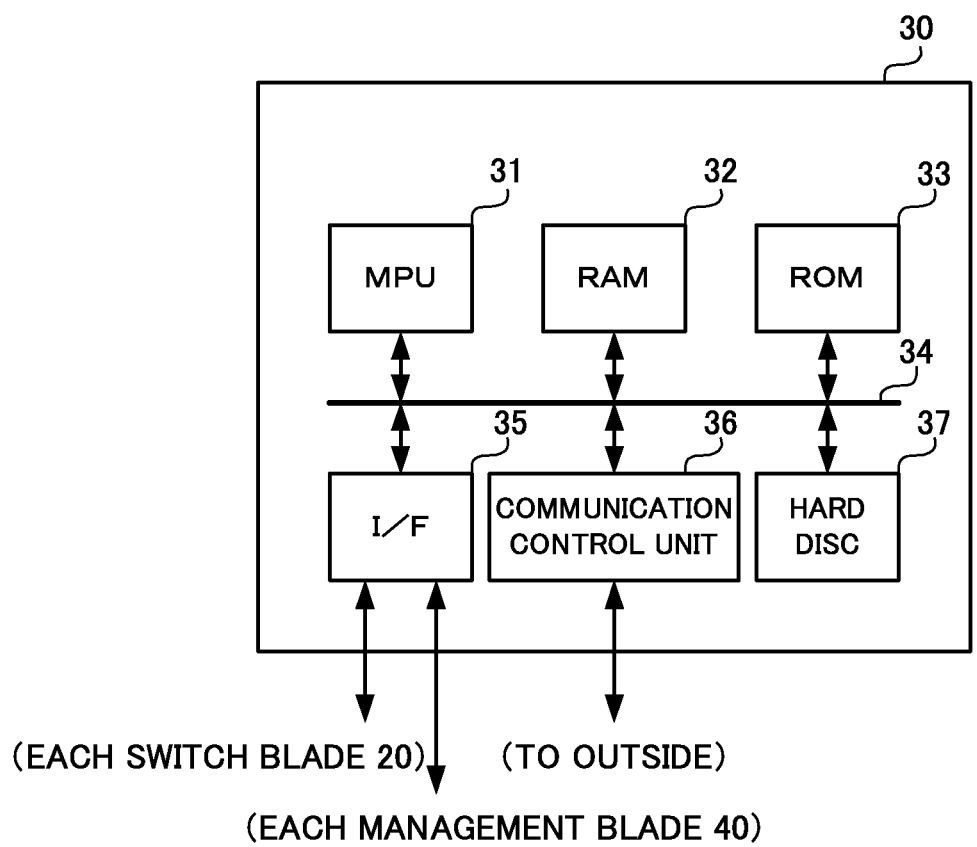
FIG. 6 is a structural view of an I/O blade of FIG. 2.

As shown in FIG. 6, the I/O blades 30 include an MPU (Micro Processing Unit) 31, a RAM (Random Access Memory) 32, a ROM (Read Only Memory) 33, a bus 34, an interface 35, a communication control unit 36, and a hard disk 37.

The interface 35 is connected to each of the switch blades 20 and each of the management blades 40. The communication control unit 36 is connected to external devices, and carries out communication between the external devices and the blade server 100 based on control of the MPU 31.

The management blades 40 observe the states of all of the blades mounted in the blade server 100 and manage the separating and connecting of the blades based on the states. Each management blade 40 is connected to all of the blades. The management blades 40 instruct the operation blades 10 that carry out the lock-stepping to carry out the same processing and issue the same packets.

Figure 7:
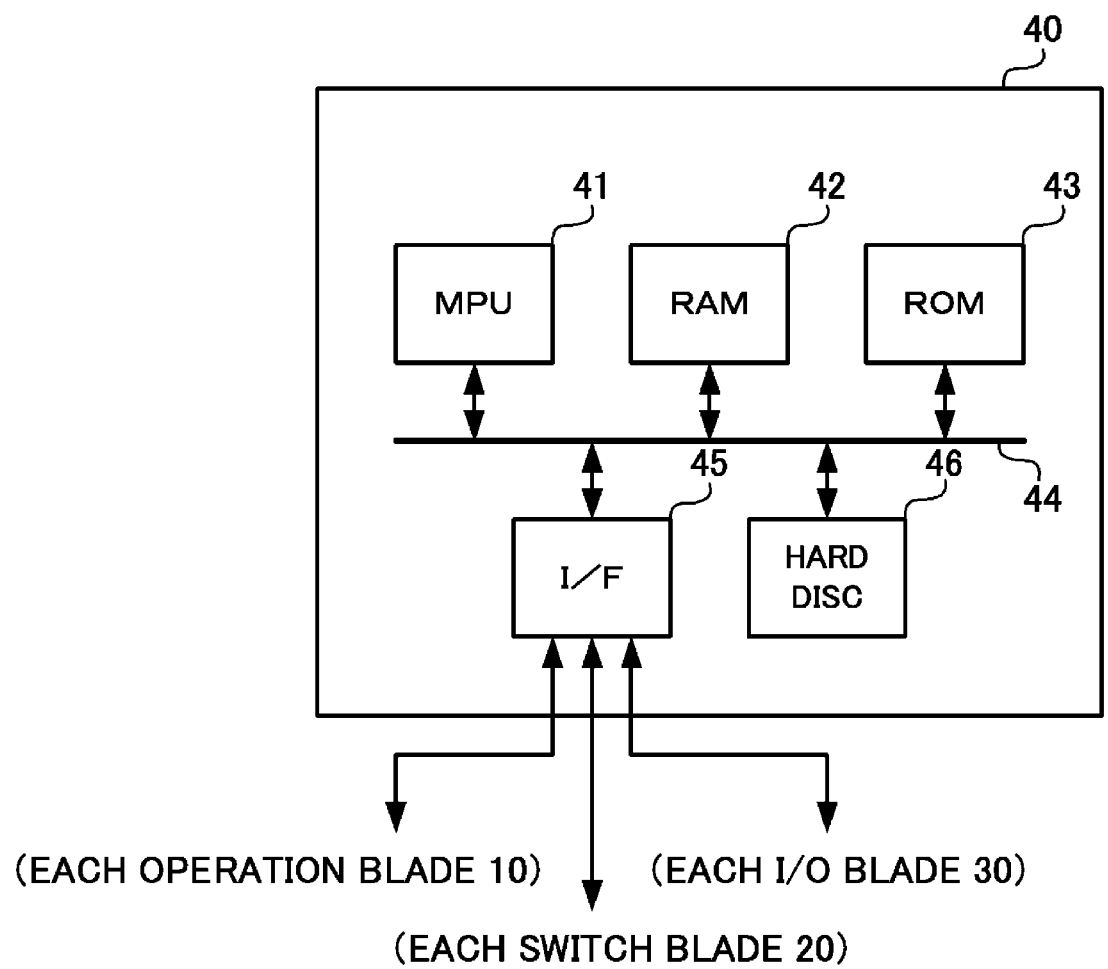
FIG. 7 is a structural view of a management blade of FIG. 2.

As shown in FIG. 7, the management blades 40 include an MPU (Micro Processing Unit) 41, a RAM (Random Access Memory) 42, a ROM (Read Only Memory) 43, a bus 44, an interface 45, and a hard disk 46. Each interface 45 is connected to all of the blades.

The following is an explanation of the operation of the blade server 100 of the above configuration.

For example, in FIG. 2, the operation blade 10-1 and the operation blade 10-2 carry out a lock-stepping, while similarly lock-stepping is carried out by the operation blade 10-3 and the operation blade 10-4 so as to bring about redundancy. It is also possible to implement redundancy by carrying out the same operations at the switch blade 20-1 and the switch blade 20-2. Redundancy is also achieved by having the management blade 40-1 and the management blade 40-2 carry out the same operations. This means that a degenerate operation can continue using only a remaining blade even if one of the redundantly provided blades fails. It is also possible for the redundantly provided blades to continue to operate.

Figure 8:
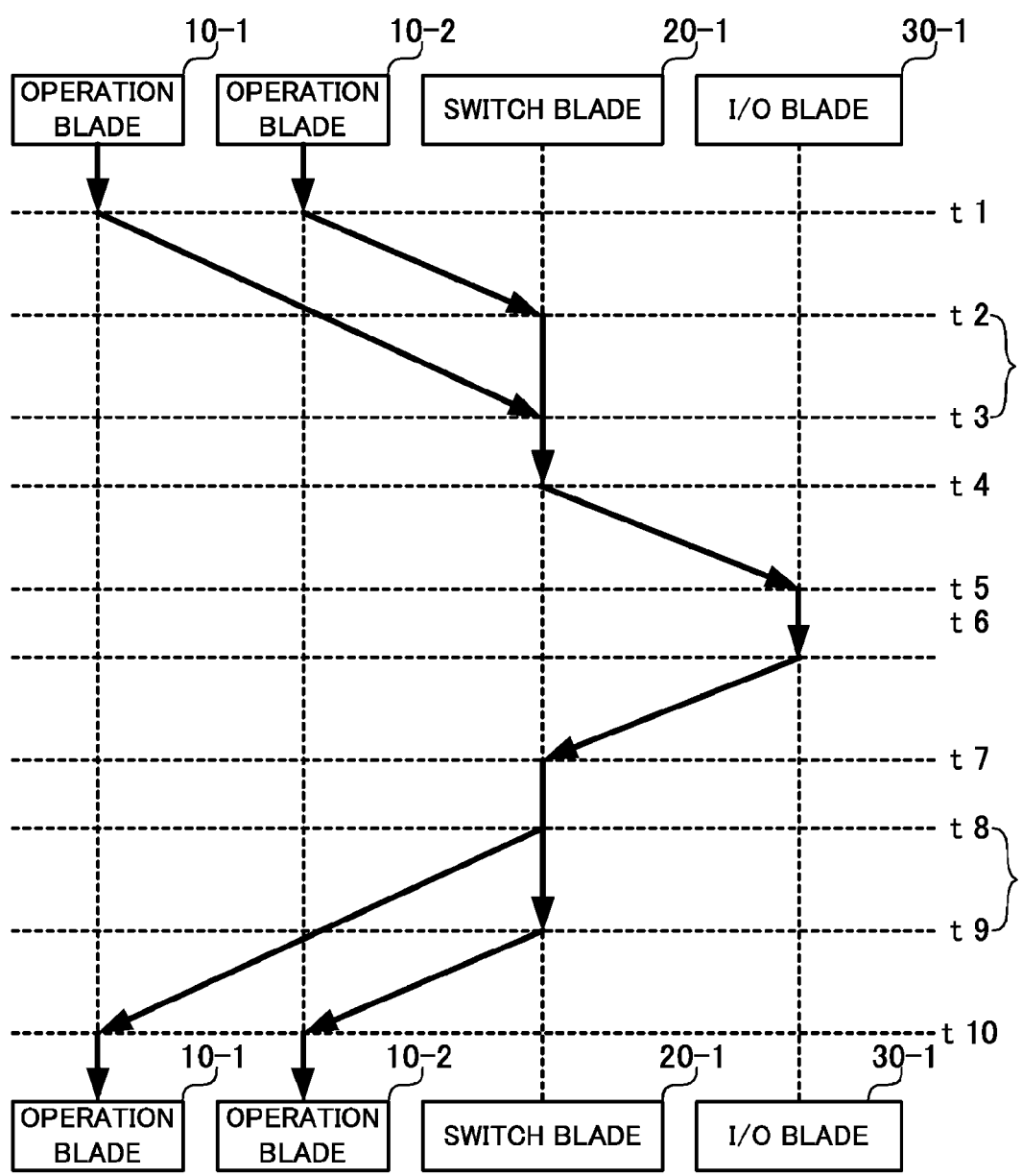
FIG. 8 is a timing diagram illustrating the exchange of packets between an operation blade and an I/O blade.

An example of packet operation occurring at the switch blades 20 is now explained using the timing diagram shown in FIG. 8. The timing diagram of FIG. 8 shows a flow of packets from the operation blade 10-1 and the operation blade 10-2 carrying out a lock-stepping, accessing the I/O blade 30-1, and receiving a response from the I/O blade 30-1.

The operation blade 10-1 and the operation blade 10-2 issue packets simultaneously at a time t1. There is, however, a possibility that a time lag of a time of t2 to t3 will occur as a result of the difference in length of the wires on the backplane before the switch blade 20-1 receives the packets.

The buffer 22 of the switch blade 20-1 then adjusts this time lag and collects the packets from the operation blades 10-1 and 10-2 at the time t3.

The comparator 25 of the switch blade 20-1 then confirms whether or not the content of these packets matches. When the content of these packets matches, the comparator 25 transfers these packets to the I/O Blade 30-1 at a time t4.

The I/O blade 30-1 then receives the packets at a time t5.

Next, at a time t6 onwards, an explanation is given of a flow where response packets are returned from the I/O blade 30-1 to the operation blades 10-1 and 10-2 via the switch blade 20-1.

At the time t6, the I/O blade 30-1 issues response packets for the packets issued by the operation blades 10-1 and 10-2.

The switch blade 20-1 then receives the response packets at a time t7.

The switch blade 20-1 then transfers the response packets to the operation blade 10-1 at a time t8 and transfers the response packets to the operation blade 10-2 at a time t9.

Describing in more detail, taking into consideration the reverse of the time lag of the times t2 to t3, the time of transfer to the operation blade 10-1 and the time of transfer to the operation blade 10-2 are made to be different based on the difference in transfer times from the switch blade 20-1 to the operation blades 10-1 and 10-2. Both of the operation blades 10-1 and 10-2 therefore receive the packets at the same time.

During the time lag of time t8 to t9, the buffer 22 connected to the operation blade 10-2 temporarily stores the packets and adjusts the time of transferring the packets in such a manner that the packets arrive at the operation blade 10-1 and the operation blade 10-2 simultaneously at a time t10.

The time lag for times t8 to t9 can be acquired easily because the time lag for times t8 to t9 is equal to the time lag for times t2 to t3.

As explained above, the blade server 100 of this embodiment of the present invention can implement a fault tolerant mechanism by mounting the switch blades 20. It is therefore possible to implement a blade server that is both highly reliable and highly available. It is also possible for a plurality of redundant systems to run in parallel within a single blade.

It is further possible to implement the same functions as the fault tolerant servers of the related art using higher density blade servers. This means that it is possible to bring about blade servers that occupy a smaller footprint, cost less, and consume less power.

Second Embodiment

In the first embodiment, the switch blade 20 selects two operation blades 10 and carries out comparison of packets of these two operation blades 10, i.e. implements redundancy. However, in a second embodiment, a switch blade 30 selects three operation blades 10 and compares packets of the three operation blades 10, i.e. performs triplication.

The structure for the blade server of the second embodiment is substantially the same as for the first embodiment. However, a switch blade 20' is mounted as the blade server in the second embodiment in place of the switch blade 20.

Figure 9:
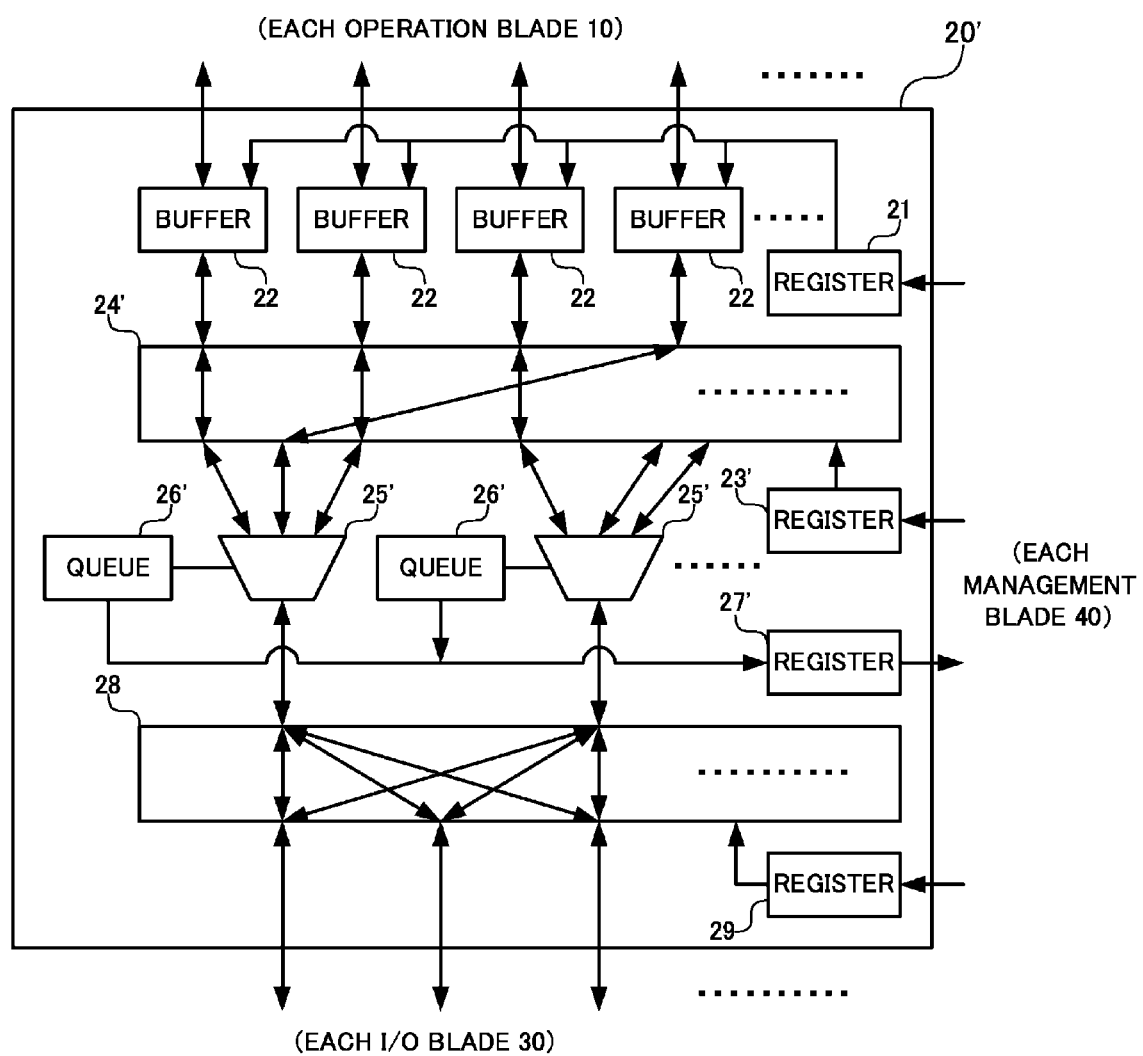
FIG. 9 is a structural view of switch blade routing of a second embodiment.

As shown in FIG. 9, the switch blade 20' includes registers 21, 23', 27', 29, a plurality of buffers 22, crossbars 24', 28, a plurality of comparators 25', and a plurality of queues 26'.

The register 23' includes the same functions as the register 23. However, the register 23' is supplied with and store first routing information for selecting three operation blades 10 from the management blades 40.

As shown in FIG. 9, the crossbar 24' connects the respective three operation blades 10 and the respective comparators 25' based on the first routing information stored in the registers 23'.

The comparators 25' compare the outbound packets and issue branches for the inbound packets.

Each of the queues 26' assigned to each of the comparators 25' then temporarily stores packets that arrive first in order to perform comparisons with another packets issued by the operation blades 10. When further packets then arrive at the comparators 25', the queues 26' delete the temporarily stored packets. The comparators 25' then compare the three packets. When the three packets match, the packets are supplied to the crossbar 28. When two of the three packets match, the matching packets are supplied to the crossbar 28.

A timeout value is set at the queues 26'. The queues 26' issues a comparison error when the second packet does not arrive at the comparators 25' from the first packet arriving until the timeout value is exceeded.

A comparison error is also issued by the queues 26' when the comparators 25' determine that all of the packets arriving from the three operation blades 10 are different.

Further, a comparison error is also issued by the queues 26' when the comparators 25' determine that only two of the packets arriving from the three operation blades 10 match.

When the comparators 25' receive two packets before the timeout value is exceeded and the two packets match, the matching packets are supplied to the crossbar 28 and the queues 26' emit a comparison error. When the two packets do not match, the queue 26' naturally emits a comparison error.

The queues 26' store the emitted comparison error in the register 27' and send this to the management blades 40. The management blades 40 then determine which blades to separate from within the blade server 100 based on this comparison error.

For example, it is appropriate to separate a portion including the operation blade 10 where the packet that has not arrived originates when the packet does not arrive. For example, when the packets are all different, it is preferable to separate portions including the three operation blades 10 where these packets originate. For example, when one of the three packets is different, it is preferable to separate the portion including the operation blade 10 where this one packet originates.

The comparators 25' transfer the same packets to the three terminals of the operation blades 10 when packets are received from the I/O blades 30. This is to say that the comparators 25' send packets to the three triplicated operation blades 10.

The blade server of the second embodiment therefore further improves reliability and availability as a result of this triplication.

The present invention is by no means limited to the above embodiments and various applications and modifications are possible.

In the above embodiments, the input/output packets of the operation blades are duplicated or triplicated but it is also possible for the input/output packets of the operation blades to be further multiplied through change by the comparators.

In the above embodiments, each blade is connected by a backplane but connection using a bus is also possible.

In addition, the specific detailed structures can be modified as deemed appropriate.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A blade server mounted with a plurality of blades and performing arbitrary processing at the plurality of blades, each blade connected by wiring from a backplane of the blade server, the blade server comprising:
   a plurality of operation blades;
   one or more input/output blades that input and output data from and to outside; and
   one or more switch blades intermediating between the operation blades and the input/output blades,
   wherein the operation blades have operation units that issue packets for the input/output blades,
   the switch blades comprise a register a plurality of buffers, a first crossbar, a second crossbar, a comparator, and a queue,
   the register storing packet delay information that represents clock delays resulting from a difference in lengths of wires on the backplane between the two or more operation blades and the switch blades,
   each of the buffers being connected to each of the operation blades, and adjusting delays in the two or more packets issued by an operation unit that the two or more operation blades connected to the buffers comprise, based on the packet delay information stored in the register,
   the first crossbar selecting two or more operation blades that carry out the same operations and issue the same packets from the plurality of operation blades, and switching wiring connecting each of the buffers and the comparators so that the two or more buffers connected to the two or more selected operation blades are connected to the comparator,
   the queue temporarily storing the packets that arrive first at the comparator of the two or more packets subject to delay adjustment by the two or more buffers connected to the comparator,
   the comparator comparing the packets temporarily stored in the queues and the packets that arrive at the comparator after the packets temporarily stored in queue and transferring the compared packets to the input/output blades based on results of comparison, and
   the second crossbar switching wiring connecting between the comparator and each of the input/output blades.

2. The blade server according to claim 1, further comprising:
   one or more management blades comprising: a monitoring unit that monitors states of the plurality of blades including the plurality of operation blades, the plurality of input/output blades, and the plurality of switch blades; and
   a connecting unit for connecting and disconnecting the plurality of blades according to the states monitored by the monitoring unit.

3. The blade server according to claim 2, wherein the monitoring unit of the management blades monitor delays of clocks between each blade,
   and the buffers of the switch blades adjust delays in the two or more packets based on the packet delay information that represents clock delays for the two or more operation blades and the switch blades monitored by the monitoring unit.

4. The blade server according to claim 3, wherein the buffers perform adjustment so that the packets arrive at the two or more operation blades at the same time based on the packet delay information that represents the clock delays between the two or more operation blades and the switch blades monitored by the monitoring unit when the switch blades receive packets sent from the input/output blades to the operation blades.

5. The blade server according to claim 2, wherein the plurality of management blades perform connection in such a manner that it is possible to carry out the same processing using a plurality of paths by combining the plurality of operation blades, the plurality of switch blades, and the plurality of input/output blades.

6. A switch blade capable of being mounted in a blade server equipped with a plurality of operation blades having operation units that issues packets, and one or plurality of input/output blades that input and output data from and to outside, where the blade server is connected by wiring from a backplane thereof to the plurality of operation blades and the plurality of input/output blades, the switch blade comprising a register, a plurality of buffers, a first crossbar, a second crossbar, a comparator, and a queue, the register storing packet delay information that represents clock delays resulting from a difference in lengths of wires on the backplane between the two or more operation blades and the switch blades, each of the buffers being connected to each of the operation blades, and adjusting delays in the two or more packets issued by an operation unit that the two or more operation blades connected to the buffers comprise, based on the packet delay information stored in the register, the first crossbar selecting two or more operation blades that carry out the same operations and issue the same packets from the plurality of operation blades, and switching wiring connecting each of the buffers and the comparators so that the two or more buffers connected to the two or more selected operation blades are connected to the comparator, the queue temporarily storing the packets that arrive first at the comparator of the two or more packets subject to delay adjustment by the two or more buffers connected to the comparator, the comparator comparing the packets temporarily stored in the queues and the packets that arrive at the comparator after the packets temporarily stored in queue and transferring the compared packets to the input/output blades based on results of comparison, and the second crossbar switching wiring connecting between the comparator and each of the input/output blades.

7. The switch blade according to claim 6, wherein the buffers adjust delays in the two or more packets based on the packet delay information that represents delays of clocks between the two or more operation blades and the switch blades monitored by an external device.

8. The switch blade according to claim 7, wherein the buffers perform adjustment so that the packets arrive at the two or more operation blades at the same time based on the packet delay information that represents the clock delays between the two or more operation blades and the switch blades when the switch blades receive packets sent from the input/output blades to the operation blades.

* * * * *